US012234429B2

(12) United States Patent
Soontravanich et al.

(10) Patent No.: US 12,234,429 B2
(45) **Date of Patent: *Feb. 25, 2025**

(54) SUSTAINABLE LAUNDRY SOUR COMPOSITIONS WITH IRON CONTROL

(71) Applicant: ECOLAB USA INC., Saint Paul, MN (US)

(72) Inventors: Sukhwan Soontravanich, Saint Paul, MN (US); Stephan Hubig, Saint Paul, MN (US); Altony J. Miralles, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/664,094

(22) Filed: May 19, 2022

(65) Prior Publication Data

US 2022/0275311 A1 Sep. 1, 2022

Related U.S. Application Data

(63) Continuation of application No. 17/248,959, filed on Feb. 15, 2021, now Pat. No. 11,339,357, which is a (Continued)

(51) Int. Cl.
*C11D 3/04* (2006.01)
*C11D 3/00* (2006.01)

(Continued)

(52) U.S. Cl.
CPC ............ *C11D 17/06* (2013.01); *C11D 3/0036* (2013.01); *C11D 3/042* (2013.01); *C11D 3/2075* (2013.01);

(Continued)

(58) Field of Classification Search
CPC ..... C11D 3/042; C11D 3/2075; C11D 3/2079; C11D 3/2068; C11D 3/33; C11D 3/3765;

(Continued)

(56) References Cited

U.S. PATENT DOCUMENTS 4,300,898 A 11/1981 North
4,404,116 A 9/1983 Young (Continued)

FOREIGN PATENT DOCUMENTS

EP 1709146 B1 10/2006
GB 2253864 9/1992

(Continued)

OTHER PUBLICATIONS

International Searching Authority, "International Search Report and Written Opinion", Issued in connection to International Application No. PCT/US2012/062981, mailed Jun. 17, 2013, 13 pages.

(Continued)

*Primary Examiner* — Gregory R Delcotto
(74) *Attorney, Agent, or Firm* — McKee, Voorhees & Sease, PLC

(57) ABSTRACT

Linen treatment compositions and linen processes are disclosed which help to prevent iron deposition from wash water, and/or redeposition after iron containing stain (such as blood) removal by alkaline detergents. The linen treatment composition is a combination of a hydroxycarboxylic acid and an acid source, which may be organic or inorganic. The invention provides for effective iron control in a phosphorus-free formula that is also free of toxic or hazardous chemicals and includes sustainable, environmentally friendly ingredients, while still providing effective iron control.

13 Claims, 2 Drawing Sheets

Related U.S. Application Data continuation of application No. 15/693,828, filed on Sep. 1, 2017, now Pat. No. 10,927,328, which is a continuation of application No. 14/790,133, filed on Jul. 2, 2015, now Pat. No. 9,783,767, which is a continuation of application No. 13/288,074, filed on Nov. 3, 2011, now abandoned.

(51) Int. Cl.

| | |
|---|---|
| ***C11D 3/20*** | (2006.01) |
| ***C11D 3/33*** | (2006.01) |
| ***C11D 3/37*** | (2006.01) |
| ***C11D 7/08*** | (2006.01) |
| ***C11D 7/26*** | (2006.01) |
| ***C11D 7/32*** | (2006.01) |
| ***C11D 17/00*** | (2006.01) |
| ***C11D 17/06*** | (2006.01) |
| ***D06L 1/16*** | (2006.01) |
| ***D06L 1/20*** | (2006.01) |

(52) U.S. Cl.

CPC .......... *C11D 3/2079* (2013.01); *C11D 3/2086* (2013.01); *C11D 3/33* (2013.01); *C11D 3/3765* (2013.01); *C11D 7/08* (2013.01); *C11D 7/265* (2013.01); *C11D 7/3245* (2013.01); *C11D 17/0047* (2013.01); *D06L 1/16* (2013.01); *D06L 1/20* (2013.01); *C11D 2111/12* (2024.01); *C11D 2111/14* (2024.01)

(58) Field of Classification Search

CPC ......... C11D 7/08; C11D 7/265; C11D 7/3245; C11D 11/0017; C11D 11/0023; C11D 17/06; C11D 17/047

USPC ....... 510/276, 336, 337, 477, 488, 480, 499, 510/445, 446; 8/137

See application file for complete search history.

(56) References Cited

U.S. PATENT DOCUMENTS

| | | | | |
|---|---|---|---|---|
| 4,589,925 | A | 5/1986 | Young | |
| 4,612,137 | A | 9/1986 | Kuroda et al. | |
| 4,648,983 | A | 3/1987 | Broze et al. | |
| 5,234,466 | A | 8/1993 | Sargent | |
| 5,616,151 | A | 4/1997 | Sargent et al. | |
| 5,718,729 | A | 2/1998 | Harris | |
| 5,972,869 | A | 10/1999 | Cao | |
| 6,102,972 | A | 8/2000 | Durrant | |
| 6,110,886 | A | 8/2000 | Scepanski | |
| 6,262,013 | B1 | 7/2001 | Smith et al. | |
| 6,297,208 | B1 | 10/2001 | Crist | |
| 6,506,261 | B1 | 1/2003 | Man | |
| 6,884,764 | B2 | 4/2005 | Szewczyk | |
| 7,608,573 | B1 | 10/2009 | Scheuing et al. | |
| 7,638,474 | B1 | 12/2009 | Parrish | |
| 7,645,731 | B1 | 1/2010 | Silvernail et al. | |
| 7,828,908 | B1 | 11/2010 | Miralles | |
| 9,783,767 | B2 | 10/2017 | Soontravanich et al. | |
| 10,927,328 | B2 | 2/2021 | Soontravanich et al. | |
| 11,339,357 | B2 * | 5/2022 | Soontravanich | D06L 1/20 |
| 2003/0144170 | A1 | 7/2003 | Arvanitidou et al. | |
| 2004/0147426 | A1 | 7/2004 | Bettiol et al. | |
| 2005/0026793 | A1 | 2/2005 | Caswell et al. | |
| 2006/0070189 | A1 | 4/2006 | Raehse | |
| 2006/0107466 | A1 | 5/2006 | Sassi | |
| 2007/0244028 | A1 | 10/2007 | Shirmer-Ditze et al. | |
| 2007/0265183 | A1 | 11/2007 | Meine et al. | |
| 2008/0041418 | A1 | 2/2008 | Yagi et al. | |
| 2008/0261852 | A1 | 10/2008 | Schirmer-Ditze et al. | |
| 2009/0069206 | A1 | 3/2009 | Panandiker | |
| 2009/0170744 | A1 | 7/2009 | Meine | |
| 2010/0035791 | A1 | 2/2010 | Igarashi | |
| 2010/0190676 | A1 | 7/2010 | Smith et al. | |
| 2010/0234271 | A1 | 9/2010 | Scheuing et al. | |
| 2011/0034366 | A1 | 2/2011 | Panandiker | |
| 2012/0047664 | A1 | 3/2012 | Barreleiro et al. | |
| 2012/0264668 | A1 | 10/2012 | Hatzelt et al. | |

FOREIGN PATENT DOCUMENTS

| | | | |
|---|---|---|---|
| WO | 9743395 | A1 | 11/1997 |
| WO | 2013181150 | | 12/2013 |

OTHER PUBLICATIONS

European Patent Office, "Communication", Issued in connection to International Application No. PCT/US2012/062981, mailed Jun. 17, 2015, 5 pages.

European Patent Office, "Communication", Issued in connection to International Application No. PCT/US2012/062981, mailed Jul. 3, 2015, 1 page.

Tianlang, et al., "Advances in Physical Inorganic Chemistry", Science Press, p. 130, Aug. 2003.

State Intellectual Property Office of the People's Republic of China, English Translation of "Notification of the Third Office Action", mailing date of Jun. 29, 2017, 9 pages.

* cited by examiner

SUSTAINABLE LAUNDRY SOUR COMPOSITIONS WITH IRON CONTROL

CROSS-REFERENCE TO RELATED APPLICATIONS

This is a continuation application of U.S. Ser. No. 17/248,959, Feb. 15, 2021, which is a continuation of U.S. Ser. No. 15/693,828, filed Sep. 1, 2017, now U.S. Pat. No. 10,927,328, issued Feb. 23, 2021, which is a continuation of U.S. Ser. No. 14/790,133, filed Jul. 2, 2015, now U.S. Pat. No. 9,783,767, issued Oct. 10, 2017, which is a continuation of U.S. Ser. No. 13/288,074, filed Nov. 3, 2011, now abandoned, all of which are herein incorporated by reference in their entirety.

FIELD OF THE INVENTION

The present invention relates to linen treatments for controlling iron deposition and for removing residual alkali from linens that are washed with an alkaline detergent. Treatment compositions and methods of use are disclosed including pre-spot, pre-treatment, pre-soak, and post wash linen sour treatments as well as methods of manufacturing of the same are disclosed.

BACKGROUND OF THE INVENTION

In typical commercial or industrial laundry processes, textile materials such as sheets, towels, wipes, garments, tablecloths, etc. are commonly laundered at elevated temperatures with alkaline detergent materials. Such detergent materials typically contain a source of alkalinity such as an alkali metal hydroxide, alkali metal silicate, alkali metal carbonate or other such base component. When the linen is treated with an alkaline detergent composition a certain amount of carryover alkalinity may occur. Carryover alkalinity refers to the chemistry that is contained within the linen (that has not been completely removed) that is available for the next step. For example, when the detergent use solution provides an alkaline environment, it is expected that the detergent use solution will provide a certain amount of carryover alkalinity for a subsequent sour treatment step unless all of the detergent use solution is removed by rinsing.

The residual components of the alkaline detergents remaining in or on the laundered item can result in fabric damage and skin irritation by the wearer of the washed fabric. This is particularly a problem with towels, sheets and garments. Sour materials contain acid components that neutralize alkaline residues on the fabric.

Another frequent problem in laundry processes are iron containing stains, such as rust, or blood, which both are difficult to remove. If not properly rinsed, remaining iron can cause permanent yellowing of fabrics. The approach to removal of blood soils to date has primarily relied upon the use of high levels of caustic, which can damage delicate fabrics and, if not properly removed and brought back to neutral pH, can result in exposure of the caustic to human skin.

Current laundry sour compositions to help remove residual alkali and for iron control generally include strong acids such as fluoroacetic acid, phosphoric acid, hydrofluoric acid, and hexafluorosilicic acid which are environmentally undesirable and/or hazardous.

As can be seen, there is a continuing need in the art for the development of iron control treatments after alkaline washing that not only prevent yellow staining of laundered fabrics, and remove residual caustic, but also that are environmentally friendly and sustainable.

It is an object of the invention to provide laundry sour compositions and methods which provide iron control and prevention of yellowing that prevent yellowing at least as well as commercially available, less environmentally friendly sour treatment alternatives.

It is an object of the present invention to provide a pre-spot, pretreatment, pre-soak, wash or post wash linen sour treatment that may be a phosphorus free formula.

It is yet another object of the invention to provide a sour treatment that is free of toxic or hazardous chemicals such as fluoroacetic acid, hydrofluoric acid, and hexafluorosilicic acid.

It is yet another object of the invention to provide a pre-spot, pretreatment, pre-soak, wash or post wash linen sour treatment that is composed of sustainable environmentally friendly ingredients.

Other objects, aspects and advantages of this invention will be apparent to one skilled in the art in view of the following disclosure, the drawings, and the appended claims.

SUMMARY OF THE INVENTION

The laundry iron-control sour compositions and linen processes of the invention make use of a fabric treatment composition that can be used in any step of the alkaline detergent linen processes, as a pre-treatment, pre-spot, pre-soak, wash, or preferably as a laundry sour following cleaning with alkaline detergent. The composition can help to neutralize remaining alkalis and also help to prevent yellowing of clothes associated with iron deposition after iron containing stain removal such as, the removal of blood and rust stains, or deposition that occurs from other sources of iron which may be present in the water. In one process of the invention, the fabric items can be contacted with an alkaline detergent material for the purpose of loosening and removing soil from the fabric to produce a treated item. The treated items are then subsequently contacted with the sour composition of the invention. In other embodiments the fabric items can be contacted with the treatment composition prior to the wash step, as a pre-treatment, a pre-spot, or pre-soak, to form a pretreated item that is then contacted with alkaline detergent. In some embodiments, the fabric may be treated with the compositions of the invention during the actual wash step as well.

The present invention includes a linen treatment composition which comprises a hydroxycarboxylic acid, an acid source, which may be organic or inorganic, and optionally a carboxylate polymer of a substituted or unsubstituted polyacrylic or polymaleic acid or their salts. The linen treatment composition serves to neutralize any remaining alkalis and also is particularly suited for removing iron from the system and preventing its deposition or redeposition on clothes.

In one embodiment, the treatment composition includes between about 15% and about 55% by weight of a hydroxycarboxylic acid, between about 6% and about 24% of an inorganic or organic acid source, and between about 0% and about 10% carboxylate polymer with the remainder being water. In one embodiment, the inorganic or organic acid component is an inorganic acid and is a combination of sulfuric acid and urea in a molar ratio of about 1:1 to form urea sulfate. In a preferred embodiment, the composition is phosphorus free. Additional components such as chelators, oxidizers, fragrances and other typical components of laundry detergents/pretreatments/sours such as surfactants etc. may also be present.

In yet another embodiment, a method of making the linen treatment composition is disclosed. The hydroxycarboxylic acid, acid source, and optional polymer are mixed to form a cleaning composition. The cleaning composition may then be diluted to form a use composition. Dilution ratios can be between about 1:10 and about 1:10,000 to form a use solution. The use solution is then contacted with a linen article to be cleaned.

The invention also includes methods for a linen cleaning process, substantially free of phosphorus that can clean and neutralize linen items, as well as control iron present in the wash water (whether present in the water after removal of iron containing stains, or present in the water for other reasons) to prevent deposition or redeposition on linens. The composition can be used as a pre-soak, a pre-spot, pre-wash step, or even as a component of the main wash step. In one embodiment, the composition is used as a sour treatment after the wash. This process includes contacting a soiled linen item with an aqueous alkaline detergent to remove soil and produce a treated linen item, and contacting the treated linen item with the aqueous linen treatment composition of the invention.

The composition also finds use as a pre-treatment stain remover, particularly for iron containing stains such as rust or blood. The process includes contacting the stain with the composition of the invention prior to any laundering for a time sufficient to loosen any iron or iron oxide components from the fabric.

DETAILED DESCRIPTION OF THE INVENTION

Figure 1:
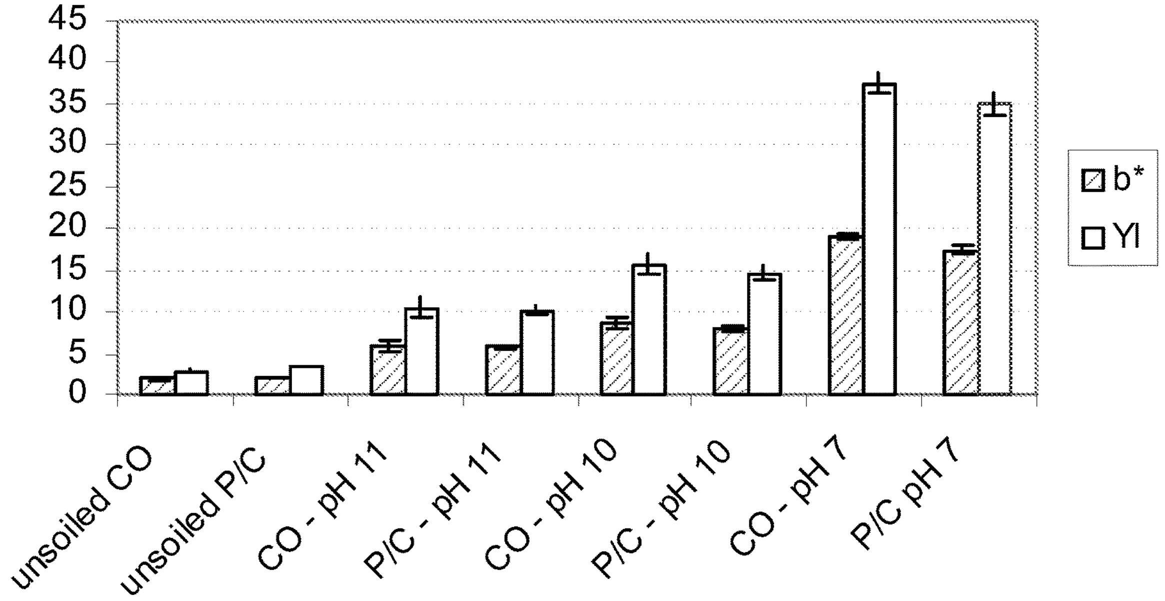
FIG. 1 is a graph showing the effect of pH on yellowness of fabric in iron supplemented water with no treatment. YI (yellowness Index) and a positive b* value are both measurements of yellow taken with a spectroscope. A higher value indicates more yellowing. As can be seen, as the pH decreases, there is an increase in the tendency of iron oxide to stain the fabric or linen. Thus an iron control treatment must strike the appropriate balance between returning the fabric to neutral pH and removing residual alkali, yet also in an iron removal situation, prevent any yellowing which is increased upon lowering pH.

So that the invention may be more readily understood, certain terms are first defined and certain test methods are described.

As used herein, "weight percent," "wt-%," "percent by weight," "% by weight," and variations thereof refer to the concentration of a substance as the weight of that substance divided by the total weight of the composition and multiplied by 100. It is understood that, as used here, "percent," "%," and the like are intended to be synonymous with "weight percent," "wt-%," etc.

It should be noted that, as used in this specification and the appended claims, the singular forms "a," "an," and "the" include plural referents unless the content clearly dictates otherwise. Thus, for example, reference to a composition containing "a compound" includes a composition having two or more compounds. It should also be noted that the term "or" is generally employed in its sense including "and/or" unless the content clearly dictates otherwise.

As used herein, the term "phosphate-free" refers to a composition, mixture, or ingredient that does not contain a phosphate or phosphate-containing compound or to which a phosphate or phosphate-containing compound has not been intentionally added. Should a phosphate or phosphate-containing compound be present through contamination of a phosphate-free composition, mixture, or ingredients, the amount of phosphate shall be less than 0.5 wt-%. More preferably, the amount of phosphate is less than 0.1 wt-%, and most preferably, the amount of phosphate is less than 0.01 wt-%.

As used herein, the term "phosphorus-free" refers to a composition, mixture, or ingredient that does not contain phosphorus or a phosphorus-containing compound or to which phosphorus or a phosphorus-containing compound has not been intentionally added. Should phosphorus or a phosphorus-containing compound be present through contamination of a phosphorus-free composition, mixture, or ingredients, the amount of phosphorus shall be less than 0.5 wt-%. More preferably, the amount of phosphorus is less than 0.1 wt-%, and most preferably the amount of phosphorus is less than 0.01 wt-%.

"Cleaning" means to perform or aid in soil removal, bleaching, microbial population reduction, rinsing, or combination thereof.

As used herein, the term "fabric treatment composition" includes, unless otherwise indicated, fabric softening compositions, fabric enhancing compositions, fabric freshening compositions and combinations thereof. Such compositions may be, but need not be rinse added compositions.

The term "linen" refers to items or articles that are cleaned in a laundry washing machine. In general, linen refers to any item or article made from or including textile materials, woven fabrics, non-woven fabrics, and knitted fabrics. The textile materials can include natural or synthetic fibers such as silk fibers, linen fibers, cotton fibers, polyester fibers, polyamide fibers such as nylon, acrylic fibers, acetate fibers, and blends thereof including cotton and polyester blends. The fibers can be treated or untreated. Exemplary treated fibers include those treated for flame retardancy. It should be understood that the term "linen" is often used to describe certain types of linen items including bed sheets, pillow cases, towels, table linen, table cloth, bar mops and uniforms.

As used herein, the term "pre-treatment stain remover" refers to a liquid, foam, gel, stick, or the like that is applied directly to a stain on a textile and is permitted to remain in contact with the stain for a period of time sufficient to pre-treat the stain before the textile is washed and rinsed during a subsequent washing cycle, typically in an automated washing machine The term "about," as used herein, modifying the quantity of an ingredient in the compositions of the invention or employed in the methods of the invention refers to variation in the numerical quantity that can occur, for example, through typical measuring and liquid handling procedures used for making concentrates or use solutions; through inadvertent error in these procedures; through differences in the manufacture, source, or purity of the ingredients employed to make the compositions or carry out the methods; and the like. The term "about" also encompasses amounts that differ due to different equilibrium conditions for a composition resulting from a particular initial mixture. Whether or not modified by the term "about," the claims include equivalents to the quantities. All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

The recitation of numerical ranges by endpoints includes all numbers subsumed within that range (e.g. 1 to 5 includes 1, 1.5, 2, 2.75, 3, 3.80, 4, and 5).

The linen treatment compositions and linen processes of the invention provide for the use of a fabric treatment composition with superior iron control that can be used in wash process, either as a pre-treatment stain remover (pre-spot, pre-soak or pre-rinse) or a linen sour treatment preferably following an alkaline detergent. The treatment composition helps to neutralize remaining alkalis and also helps to prevent iron deposition on the linen. Iron may be present in the water used in the wash process in general, or may stem from stain removal, such as, the removal of rust or blood stains which contain iron. In the processes of the invention, the fabric items can be contacted with an alkaline detergent material for the purpose of loosening and removing soil from the fabric to produce a treated item. The treated items are then subsequently contacted with the treatment composition of the invention. The compositions also find use as a pre-treatment stain remover, particularly for iron containing stains such as rust or blood. The process includes contacting the stain with the composition of the invention prior to any laundering for a time sufficient to loosen any iron or iron oxide components from the fabric.

The present invention includes a linen sour/pretreatment stain remover composition which comprises a hydroxycarboxylic acid and an acid source (organic or inorganic, preferably inorganic). The composition may also optionally include a carboxylate polymer including but not limited to a substituted or unsubstituted polyacrylic or polymaleic acid or salts thereof. The treatment composition use solution has a pH of 5 to about 7, and serves to neutralize any remaining alkalis and also is particularly suited for removing iron from the system and preventing concomitant yellowing of clothes caused by redeposition of iron after on the linen.

In one embodiment, the treatment composition includes between about 15% and about 55% weight percent of a hydroxycarboxylic acid, preferably about 20% to about 50%, and more preferably between about 25% to about 45%. The composition includes between about 6% and about 24% of an inorganic or organic acid source, preferably between about 9% and 21%, and more preferably between about 12% and 18%. The carboxylate polymer when present can be in an amount from about 0% to about 10%, preferably from about 0% to about 8%, and more preferably from about 0% to about 6% with the remainder being water. In one embodiment, the inorganic or organic acid component is an inorganic acid and is a combination of sulfuric acid and urea in a molar ratio of about 1:1 to form urea sulfate. In a preferred embodiment, the composition is phosphorus free. Additional components such as chelators, oxidizers, fragrances and other typical components of laundry detergents/pretreatments/sours such as surfactants etc. may also be present.

In yet another embodiment, a method of making the linen treatment composition is disclosed. The hydroxycarboxylic acid, acid source, and optional polymer are mixed to form a cleaning composition. The cleaning composition may then be diluted to form a use composition. Dilution ratios can be between about 1:10 and about 1:10,000 to form a use solution. The use solution is then contacted with a linen article to be cleaned.

The invention also includes methods for a linen cleaning process, that can clean and neutralize linen items, as well as control iron present in the wash water (whether present in the water after removal from iron containing stains, or present in the water for other reasons) to prevent deposition or redeposition on linens. The composition can be used as a pre-soak, a pre-spot, a pre-wash step, or even as a component of the main wash step. In one embodiment, the composition is used as a sour treatment after wash. This process includes contacting a soiled linen item with an aqueous alkaline detergent to remove soil and produce a treated linen item, and contacting the treated linen item with the aqueous linen treatment composition of the invention.

The composition also finds use as a pre-treatment stain remover, particularly for iron containing stains such as rust or blood. The process includes contacting the stain with the composition of the invention prior to any laundering for a time sufficient to loosen any iron or iron oxide components from the fabric.

The invention is also found in a process for iron control in the linen wash process, for removal of blood and rust or other iron containing stains, or prevention of yellowing in case the wash water has a high iron content, either prior to, or after washing with an alkaline detergent. This process includes contacting the item with the above described linen treatment composition.

The laundry sour/stain pretreatment compositions may be a liquid, thickened liquid, gelled liquid, paste, granular or pelletized solid material, solid block, cast solid block, powder, tablet, or the like. Liquid compositions can typically be made by forming the ingredients in an aqueous liquid or aqueous liquid solvent system. Such systems are typically made by dissolving or suspending the active ingredients in water or in a compatible solvent and then diluting the product to an appropriate concentration, either to form a concentrate or a use solution thereof. Gelled compositions can be made similarly by dissolving or suspending the active ingredients in a compatible aqueous, aqueous liquid or mixed aqueous organic system including a gelling agent at an appropriate concentration. Solid particulate materials can be made by merely blending the dry solid ingredients in appropriate ratios or agglomerating the materials in appropriate agglomeration systems. Pelletized materials can be manufactured by compressing the solid granular or agglomerated materials in appropriate pelletizing equipment to result in appropriately sized pelletized materials. Solid block and cast solid block materials can be made by introducing into a container either a prehardened block of material or a castable liquid that hardens into a solid block within the container.

The compositions may be provided in bulk or in unit dose. For example, the compositions may be provided in a large solid block that may be used for many cleaning cycles. Alternatively, the compositions may be provided in unit dose form wherein a new composition is provided for each new cleaning cycle.

The compositions may be packaged in a variety of materials including a water soluble film, disposable plastic container, flexible bag, shrink wrap, and the like. Further, the compositions may be packaged in such a way as to allow for multiple forms of product in one package, for example, a liquid and a solid in one unit dose package.

The alkaline detergent and linen treatment composition may be either provided or packaged separately or together. For example, the alkaline detergent composition may be provided and packaged completely separate from the treatment composition. Alternatively, the alkaline detergent and treatment compositions may be provided together in one package. For example, the alkaline detergent and linen treatment compositions may be provided in a layered block or tablet wherein the first layer is the alkaline detergent composition, and the second layer is the linen treatment composition. It is understood that this layered arrangement may be adjusted to provide for more steps as contemplated by the invention or to include additional washes or rinses. The individual layers preferably have different characteristics that allow them to dissolve at the appropriate time. For example, the individual layers may dissolve at different temperatures that correspond to different wash cycles; the layers may take a certain amount of time to dissolve so that they dissolve at the appropriate time during the wash cycle; or the layers may be divided by a physical barrier that allows them to dissolve at the appropriate time, such as a paraffin layer, a water soluble film, or a chemical coating.

In addition to providing the alkaline detergent and linen treatment compositions in layers, compositions may also be in separate domains, for example, wherein each domain is dissolved by a separate spray when the particular composition is desired.

Compositions of the Invention

Acid Source

The linen treatment composition of the present invention includes at least one acid source including an organic or inorganic acid. The acids preferably do not include phosphates or silicates. Both organic and inorganic acids have been found to be generally useful in the present composition. Examples of suitable organic acids include carboxylic acids such as but not limited to hydroxyacetic (glycolic) acid, citric acid, formic acid, acetic acid, propionic acid, butyric acid, valeric acid, caproic acid, trichloroacetic acid, urea hydrochloride, and benzoic acid, among others. Organic dicarboxylic acids such as oxalic acid, malonic acid, gluconic acid, itaconic acid, succinic acid, glutaric acid, maleic acid, fumaric acid, adipic acid, and terephthalic acid among others are also useful in accordance with the invention. Any combination of these organic acids may also be used intermixed or with other organic acids which allow adequate formation of the composition of the invention.

Inorganic acids useful in accordance with the invention include sulfuric acid, sulfamic acid, methylsulfamic acid, hydrochloric acid, hydrobromic acid, and nitric acid among others. These acids may also be used in combination with other inorganic acids or with those organic acids mentioned above. In a preferred embodiment, the acid is an inorganic acid.

In one embodiment, the acid (organic or inorganic) preferably comprises in the range from about 6 to about 24 wt.-% of the total linen treatment composition, preferably in the range from about 9 to about 21 wt.-% of the total linen treatment composition, and more preferably in the range from about 12 to about 18 wt.-% of the total linen treatment composition.

Urea Sulfate

In yet another preferred embodiment, urea and sulfuric acid may be used to create urea sulfate as the acid source.

Preparation of Urea Sulfate

Urea is weakly basic, forming salts with strong acids. Urea sulfate is a salt formed from the simple mixture of urea with sulfuric acid. Common urea sulfate salts include the 1:1 urea to sulfuric acid salt (CAS 21351-39-3), and the 2:1 urea to sulfuric acid salt (CAS 17103-31-0). The 2:1 urea sulfuric acid salt is sold by Aldrich Chemical Company. Any desired ratio of urea to sulfuric acid that performs the desired function in a linen treatment solution can be prepared by simply mixing the appropriate ratios of components, typically in water. The mixing of urea with sulfuric acid typically results in an exotherm that should be handled with care.

The preferred composition is an aqueous solution of sulfuric acid and urea that are combined in a 1:1 molar ratio or with a slight excess of urea. This composition results in a sulfuric acid urea salt solution that has the neutralization ability of sulfuric acid when used, for example, to reduce the pH of the rinse water, but is less corrosive than sulfuric acid or sulfamic acid by itself. It is easier and much safer to handle than either sulfuric or sulfamic acid solutions.

Any amount of urea sulfate can be used, with any molar ratio of urea and sulfuric acid, as long as it performs the desired function. Given the disclosure herein, one of ordinary skill in the art can easily manipulate the ratio of urea and sulfuric acid, and the amount of salt used, to obtain a desired pH. Methods to determine pH are well known to those of skill in the art. When present, the urea sulfate is present in the treatment composition in the same weight percentages as the acid source supra.

Hydroxycarboxylic Acid

The term hydroxycarboxylic acid refers generally to organic acids that feature at least one alcoholic hydroxyl and one carboxyl group in the molecule, such as but not limited to: glycolic acid, gluconic acid, malic acid, lactic acid, tartaric acid, citric acid, hydroxybutyric acid, glyceric acid, tartronic acid, and like aliphatic hydroxycarboxylic acids, and salicylic acid, m-hydroxybenzoic acid, p-hydroxybenzoic acid, gallic acid, mandelic acid, tropic acid, and like aromatic hydroxycarboxylic acids or mixtures thereof. In a preferred embodiment, the acid is gluconic acid or citric acid. These hydroxycarboxylic acids are usable singly, or two or more can be used at the same time when so desired.

The hydroxycarboxylic acid may also include substituted carboxylic acids. The substituted carboxylic acids may include diacids and triacids as well. The substituted carboxylic acid may be substituted with amino groups, keto groups, aldehyde groups, and mixtures thereof, and the like. In one embodiment, the hydroxycarboxylic acid has 8 carbon atoms or less, preferably 6 carbon atoms or less.

The acid is preferably present in the treatment composition from about 15 wt.-% to about 55 wt.-%, more preferably from about 20 wt.-% to about 50 wt.-% and most preferably from about 25 wt.-% to about 45 wt.-%.

Carboxylate Polymer

The invention also includes one or more carboxylate polymers which include polymers or copolymers of acrylic acid or maleic acid, and further includes substituted or functionalized analogs of the same.

The polyacrylic acid polymer contains a polymerization unit derived from the monomer selected from the group consisting of acrylic acid, methacrylic acid, methyl acrylate, methyl methacrylate, ethyl acrylate, ethyl methacrylate, butyl acrylate, butyl methacrylate, iso-butyl acrylate, iso-butyl methacrylate, iso-octyl acrylate, iso-octyl methacrylate, cyclohexyl acrylate, cyclohexyl methacrylate, glycidyl acrylate, glycidyl methacrylate, hydroxyethyl acrylate, hydroxypropyl acrylate, 2-hydroxyethyl acrylate, 2-hydroxyethyl methacrylate, 2-hydroxypropyl acrylate, 2-hydroxypropyl methacrylate, and hydroxypropyl methacrylate and a mixture thereof, among which acrylic acid, methacrylic acid, methyl acrylate, methyl methacrylate, butyl acrylate, butyl methacrylate, iso-butyl acrylate, iso-butyl methacrylate, hydroxyethyl acrylate, 2-hydroxyethyl acrylate, 2-hydroxyethyl methacrylate, 2-hydroxypropyl acrylate, and 2-hydroxypropyl methacrylate, and a mixture thereof.

The above-mentioned acrylate monomers can be selected from the group consisting of methyl acrylate, methyl methacrylate, butyl acrylate, 2-phenoxy ethyl acrylate, ethoxylated 2-phenoxy ethyl acrylate, 2-(2-ethoxyethoxy)ethyl acrylate, cyclic trimethylolpropane formal acrylate, β-carboxyethyl acrylate, lauryl(meth)acrylate, isooctyl acrylate, stearyl(meth)acrylate, isodecyl acrylate, isoborny(meth) acrylate, benzyl acrylate, hydroxypivalyl hydroxypivalate diacrylate, ethoxylated 1,6-hexanediol diacrylate, dipropylene glycol diacrylate, ethoxylated dipropylene glycol diacrylate, neopentyl glycol diacrylate, propoxylated neopentyl glycol diacrylate, ethoxylated bisphenol-A di(meth)acrylate, 2-methyl-1,3-propanediol diacrylate, ethoxylated 2-methyl-1,3-propanediol diacrylate, 2-butyl-2-ethyl-1,3-propanediol diacrylate, ethylene glycol dimethacrylate, diethylene glycol dimethacrylate, 2-hydroxyethyl methacrylate phosphate, tris (2-hydroxy ethyl)isocyanurate triacrylate, pentaerythritol triacrylate, ethoxylated trimethylolpropane triacrylate, propoxylated trimethylolpropane triacrylate, trimethylolpropane trimethacrylate, pentaerythritol tetraacrylate, ethoxylated pentaerythritol tetraacrylate, ditrimethylolpropane tetraacrylate, propoxylated pentaerythritol tetraacrylate, pentaerythritol tetraacrylate, dipentaerythritol hexaacrylate, (meth)acrylate, hydroxyethyl acrylate (HEA), 2-hydroxyethyl methacrylate (HEMA), tripropylene glycol di(meth) acrylate1,4-butanediol di(meth)acrylate, 1,6-hexanediol di(meth)acrylate, allylated cyclohexyl di(meth)acrylate, isocyanurate di(meth)acrylate, ethoxylated trimethylol propane tri(meth)acrylate, propoxylated glycerol tri(meth)acrylate, trimethylol propane tri(meth)acrylate, and tris(acryloxyethyl)isocyanurate, and a mixture thereof.

Examples of polyacrylic acid polymers which may be used for the invention are those with a molecular weight of at least about 5000. One source of commercially available polyacrylates (polyacrylic acid polymers) useful for the invention includes the Acusol 445 series from The Dow Chemical Company, Wilmington Delaware, USA. Other polyacrylates (polyacrylic acid homopolymers) commercially available are Acusol 929 (10,000 MW) and Acumer 1510 (60,000 MW) both also available from Dow Chemical. Yet another commercially available polyacrylic acid is AQUATREAT AR-6 (100,000 MW) from AkzoNobel Strawinskylaan 2555 1077 ZZ Amsterdam Postbus 75730 1070 AS Amsterdam. Other suitable polyacrylates (polyacrylic acid homopolymers) for use in the invention include, can be obtained from suppliers such as Aldrich Chemicals, Milwaukee, Wis., and ACROS Organics and Fine Chemicals, Pittsburgh, Pa.

Polymaleic acid $(C_4H_2O_3)_x$ polymers or hydrolyzed polymaleic anhydride or cis-2-butenedioic acid homopolymer, has the structural formula:

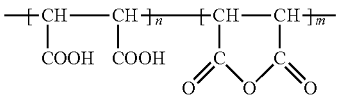

where n and m are any integer.

Preferred polymaleic acid polymers which may be used for the invention those with a molecular weight of about 400-800. Commercially available polymaleic acids include the Belclene 200 series of maleic acid homopolymers from BWA™ Water Additives, 979 Lakeside Parkway, Suite 925 Tucker, GA 30084, USA Particularly preferred is Belclene 200.

Chelant

The treatment composition may optionally also include a chelant. Suitable chelants include amino polycarboxylates, including but not limited to diethylene triamine pentaacetate, diethylene triamine penta(methyl phosphonic acid), ethylene diamine-N'N'-disuccinic acid, ethylene diamine tetraacetate, ethylene diamine tetra(methylene phosphonic acid) and hydroxyethane di(methylene phosphonic acid). Preferably the chelating agent is a biodegradable aminopolycarboxylate such as glutamic acid (GLDA), methylglycinediacetic acid (MGDA), L-aspartic acid N,N-diacetic acid tetrasodium salt (ASDA), DEG/HEIDA (sodium diethanolglycine/2-hydroxyethyliminodiacetic acid, disodium salt), iminodisuccinic acid and salts (IDS), and ethylenediaminedisuccinic acid and salts (EDDS). When present the chelant may be in the composition in an amount of from about 0% to about 8% preferably from about 0% to 6% and more preferably from about 0% to 4% by weight of the composition.

Other Additives

The linen treatment composition can include any other additives that are traditionally found in laundry cleaning products, such as sequestering agents, bleaching agents, detergent builders or fillers, hardening agents or solubility modifiers, defoamers, anti-redeposition agents, threshold agents, stabilizers, builders, dispersants, enzymes, aesthetic enhancing agents (i.e., dye, perfume), and the like. Adjuvants and other additive ingredients will vary according to the type of composition being manufactured. It should be understood that these additives are optional and need not be included in the treatment composition. When they are included, they can be included in an amount that provides for the effectiveness of the particular type of component.

Water Conditioning Agents

Water conditioning polymers can be present as a form of builder. Exemplary water conditioning polymers include polycarboxylates. Exemplary polycarboxylates that can be used as builders and/or water conditioning polymers include those having pendant carboxylate ($—CO_2.^-$) groups and include, for example, polyacrylic acid, maleic/olefin copolymer, acrylic/maleic copolymer, polymethacrylic acid, acrylic acid-methacrylic acid copolymers, hydrolyzed polyacrylamide, hydrolyzed polymethacrylamide, hydrolyzed polyamide-methacrylamide copolymers, hydrolyzed polyacrylonitrile, hydrolyzed polymethacrylonitrile, hydrolyzed acrylonitrile-methacrylonitrile copolymers, and the like. For a further discussion of chelating agents/sequestrants, see Kirk-Othmer, Encyclopedia of Chemical Technology, Third Edition, volume 5, pages 339-366 and volume 23, pages 319-320, the disclosure of which is incorporated by reference herein.

Bleaching Agents

Bleaching agents for use in an acidic cleaning/sour composition for whitening a substrate or stain removal include bleaching compounds capable of liberating active oxygen, such as hydrogen peroxide, peroxycarboxylic acids, or a combination thereof. The composition can include an effective amount of a bleaching agent. In a preferred embodiment when the treatment composition includes a bleaching agent, it can be included in an amount of about 0.1 wt. % to about 60 wt. %, more preferably between about 1 wt. % and about 20 wt. %, and most preferably between about 5 wt. % and about 15 wt. %.

Fillers

The composition can include an effective amount of fillers, which do not perform as a cleaning/sour agent per se, but cooperates with the cleaning agent to enhance the overall cleaning capacity of the composition. Examples of fillers suitable for use in the present cleaning compositions include sodium sulfate, sodium chloride, starch, sugars, alcohols $C_1$-$C_{10}$ alkylene glycols such as propylene glycol, and the like. When the composition includes a detergent filler, it can be included an amount of about 1 wt. % to about 80 wt. %.

Defoaming Agent

A defoaming agent for reducing the stability of foam may also be included in the composition to reduce foaming. When the composition includes a defoaming agent, the defoaming agent can be provided in an amount of between about 0.01 wt. % and about 3 wt. %.

Examples of defoaming agents that can be used in the composition includes ethylene oxide/propylene block copolymers, silicone compounds such as silica dispersed in polydimethylsiloxane, polydimethylsiloxane, and functionalized polydimethylsiloxanes such as those available under the name Abil B9952, fatty amides, hydrocarbon waxes, fatty acids, fatty esters, fatty alcohols, fatty acid soaps, ethoxylates, mineral oils, polyethylene glycol esters, alkyl phosphate esters such as monostearyl phosphate, and the like. A discussion of defoaming agents may be found, for example, in U.S. Pat. No. 3,048,548 to Martin et al., U.S. Pat. No. 3,334,147 to Brunelle et al., and U.S. Pat. No. 3,442,242 to Rue et al., the disclosures of which are incorporated by reference herein.

Anti-Redeposition Agent

The treatment composition can include an anti-redeposition agent for facilitating sustained suspension of soils in a cleaning solution and preventing the removed soils from being redeposited onto the substrate being cleaned. Examples of suitable anti-redeposition agents include fatty acid amides, fluorocarbon surfactants, complex phosphate esters, styrene maleic anhydride copolymers, and cellulosic derivatives such as hydroxyethyl cellulose, hydroxypropyl cellulose, and the like. In a preferred embodiment, the anti-redeposition agent when present in the treatment composition, is added in an amount between about 0.5 wt. % and about 10 wt. %, and more preferably between about 1 wt. % and about 5 wt. %.

Stabilizing Agent

Stabilizing agents that can be used include citric acid, glycerine, maleonic acid, organic diacids, polyols, propylene glycol, and mixtures thereof. The treatment composition need not include a stabilizing agent, but when the concentrate includes a stabilizing agent, it can be included in an amount that provides the desired level of stability of the concentrate. In a preferred embodiment the amount of stabilizing agent is about 0 to about 20 wt. %, more preferably about 0.5 wt. % to about 15 wt. %, and most preferably about 2 wt. % to about 10 wt. %.

Dispersants

Dispersants that can be used in the composition include maleic acid/olefin copolymers, polyacrylic acid, and mixtures thereof. The concentrate need not include a dispersant, but when a dispersant is included it can be included in an amount that provides the desired dispersant properties. Exemplary ranges of the dispersant in the treatment composition can be between about 0 and about 20 wt. %, more preferably between about 0.5 wt. % and about 15 wt. %, and most preferably between about 2 wt. % and about 9 wt. %.

Water

The linen treatment composition can include water. In general, it is expected that water may be present as a processing aid and may be removed or become water of hydration. It is expected that water may be present in both liquid concentrate and in solid concentrate forms of the treatment composition. In the case of the liquid concentrate, it is expected that water will be present in a range of between about 5 wt. % and about 95 wt. %, more preferably between about 20 wt. % and about 75 wt. %, and most preferably between about 30 wt. % and about 50 wt. %. In the case of a solid concentrate, it is expected that the water will be present in ranges between about 5 wt. % and about 60 wt. %, more preferably between about 15 wt. % and about 45 wt. %, and most preferably between about 25 wt. % and about 40 wt. %. It should be additionally appreciated that the water may be provided as deionized water or as softened water.

Other

Various dyes, odorants including perfumes, and other aesthetic enhancing agents can be included in the composition. Dyes may be included to alter the appearance of the composition, as for example, Direct Blue 86 (Miles), Fastusol Blue (Mobay Chemical Corp.), Acid Orange 7 (American Cyanamid), Basic Violet 10 (Sandoz), Acid Yellow 23 (GAF), Acid Yellow 17 (Sigma Chemical), Sap Green (Keystone Analine and Chemical), Metanil Yellow (Keystone Analine and Chemical), Acid Blue 9 (Hilton Davis), Sandolan Blue/Acid Blue 182 (Sandoz), Hisol Fast Red (Capitol Color and Chemical), Fluorescein (Capitol Color and Chemical), Acid Green 25 (Ciba-Geigy), and the like.

Fragrances or perfumes that may be included in the compositions include, for example, terpenoids such as citronellol, aldehydes such as amyl cinnamaldehyde, a jasmine such as C1S-jasmine or jasmal, vanillin, and the like.

The linen treatment compositions of the invention may exist in a use solution or concentrated solution that is in any form including liquid, free flowing granular form, powder, gel, paste, solids, slurry, and foam. The treatment composition of this invention may be used at any temperature, including an elevated temperature of about 90-180° F.

In the context of one embodiment of a linen washing operation, it is expected that the linen will undergo a linen washing step in the presence of a detergent use solution. At least a portion of the detergent use solution can be drained from the linen prior to the step of treating the linen with a linen treatment composition. Alternatively, at least a portion of the detergent use solution can be drained from the linen and the linen can be rinsed to further remove the detergent use solution from the linen prior to the step of treating the linen with a linen treatment composition. Various techniques for washing linen with a detergent use solution can be utilized according to the invention for cleaning linen prior to the step of treating with a linen treatment composition.

The detergent use solution can be an alkaline or an acidic detergent use solution, but preferably an alkaline detergent is considered. Various techniques for cleaning that include alkaline cleaning are described in United States Patent Application Publication No. 2003/0162682 that was filed with the United States Patent and Trademark Office on Aug. 28, 2003, and U.S. Pat. No. 6,194,371 that was filed on Feb. 7, 2001, the entire disclosures of which is incorporated herein by reference. In general, it is expected that an alkaline wash refers to a wash that takes place at a pH at between about 7 and about 13, and can include a pH of between about 8 and about 12. In general, it is understood that an acid wash refers to a wash having a pH of between about 1 and about 6, and can refer to a wash having a pH in the range of about 2 to about 4.

Conventional Detergent Compositions

The processes of the invention utilize a conventional alkaline detergent composition either after the initial pretreatment step, or prior to a sour treatment in a final rinse. In some embodiments, the treatment composition may be used as a part of, or packaged with a conventional detergent compositions include surfactants, builders or sequestrants and minor ingredients. The following is a general overview of detergent compositions which may be used in the processes of the invention.

Surfactants

Useful anionic surfactants include the water soluble salts, preferably the alkali metal, ammonium and alkylammonium salts, of organic sulfuric reaction products having in their molecular structure an alkyl group containing from about 10 to about 20 carbon atoms and a sulfonic acid or sulfuric acid ester group. (Included in the term "alkyl" is the alkyl portion of acyl groups.) Examples of this group of synthetic surfactants are the sodium and potassium alkyl sulfates, especially those obtained by sulfating the higher alcohols ($C_{12}$-$C_{18}$ carbon atoms) such as those produced by reducing the glycerides of tallow or coconut oil; and the sodium and potassium alkylbenzene sulfonates in which the alkyl group contains from about 10 to about 16 carbon atoms, in straight chain or branched chain configuration, e.g., see U.S. Pat. Nos. 2,220,099 and 2,477,383. Especially valuable are linear straight chain alkylbenzene sulfonates in which the average number of carbon atoms in the alkyl group is from about 11 to 14, abbreviated as $C_{11-14}$ LAS. Also, preferred are mixtures of $C_{10-16}$ (preferably $C_{11-13}$) linear alkylbenzene sulfonates and $C_{12-18}$ (preferably $C_{14-16}$) alkyl sulfates, alkyl ether sulfates, alcohol ethoxylate sulfates, etc.

Other anionic surfactants herein are the sodium alkyl glyceryl ether sulfonates, especially those ethers of higher alcohols derived from tallow and coconut oil; sodium coconut oil fatty acid monoglyceride sulfonates and sulfates; sodium or potassium salts of alkyl ethylene oxide ether sulfates containing from about 1 to about 10 units of ethylene oxide per molecule and wherein the alkyl groups contain from about 8 to about 12 carbon atoms; and sodium or potassium salts of alkyl ethylene oxide ether sulfates containing about 1 to about 10 units of ethylene oxide per molecule and wherein the alkyl group contains from about 10 to about 20 carbon atoms.

Other useful anionic surfactants herein include the water soluble salts of esters of alpha-sulfonated fatty acids containing from about 6 to 20 carbon atoms in the fatty acid group and from about 1 to 10 carbon atoms in the ester group; water soluble salts of 2-acyloxyalkane-1-sulfonic acids containing from about 2 to 9 carbon atoms in the acyl group and from about 9 to about 23 carbon atoms in the alkane moiety; water soluble salts of olefin and paraffin sulfonates containing from about 12 to 20 carbon atoms; and beta-alkyloxy alkane sulfonates containing from about 1 to 3 carbon atoms in the alkyl group and from about 8 to 20 carbon atoms in the alkane moiety.

Also useful are surface active substances which are categorized as anionics because the charge on the hydrophobe is negative; or surfactants in which the hydrophobic section of the molecule carries no charge unless the pH is elevated to neutrality or above (e.g. carboxylic acids). Carboxylate, sulfonate, sulfate and phosphate are the polar (hydrophilic) solubilizing groups found in anionic surfactants. Of the cations (counterions) associated with these polar groups, sodium, lithium and potassium impart water solubility and are most preferred in compositions of the present invention.

Examples of suitable synthetic, water soluble anionic compounds are the alkali metal (such as sodium, lithium and potassium) salts or the alkyl mononuclear aromatic sulfonates such as the alkyl benzene sulfonates containing from about 5 to about 18 carbon atoms in the alkyl group in a straight or branched chain, e.g., the salts of alkyl benzene sulfonates or of alkyl naphthalene sulfonate, dialkyl naphthalene sulfonate and alkoxylated derivatives. Other anionic detergents are the olefin sulfonates, including long chain alkene sulfonates, long chain hydroxyalkane sulfonates or mixtures of alkenesulfonates and hydroxyalkane-sulfonates and alkylpoly (ethyleneoxy) ether sulfonates. Also included are the alkyl sulfates, alkyl poly (ethyleneoxy) ether sulfates and aromatic poly (ethyleneoxy) sulfates such as the sulfates or condensation products of ethylene oxide and nonyl phenol (usually having 1 to 6 oxyethylene groups per molecule).

Water soluble nonionic surfactants are also useful in the instant detergent granules. Such nonionic materials include compounds produced by the condensation of alkylene oxide groups (hydrophilic in nature) with an organic hydrophobic group or compound, which may be aliphatic or alkyl in nature. The length of the polyoxyalkylene group which is condensed with any particular hydrophobic group can be readily adjusted to yield a water soluble compound having the desired degree of balance between hydrophilic and hydrophobic elements.

Included are the water soluble and water dispersible condensation products of aliphatic alcohols containing from 8 to 22 carbon atoms, in either straight chain or branched configuration, with from 3 to 12 moles of ethylene oxide per mole of alcohol. Nonionic surfactants are generally characterized by the presence of an organic hydrophobic group and an organic hydrophilic group and are typically produced by the condensation of an organic aliphatic, alkyl aromatic or polyoxyalkylene hydrophobic compound with a hydrophilic alkylene oxide moiety which in common practice is ethylene oxide or a polyhydration product thereof, polyethylene glycol. Practically any hydrophobic compound having a hydroxyl, carboxyl, amino, or amido group with a reactive hydrogen atom can be condensed with ethylene oxide, or its polydration adducts, or its mixtures with alkoxylenes such as propylene oxide to form a nonionic surface-active agent. The length of the hydrophilic polyoxyalkylene moiety which is condensed with any particular hydrophobic compound can be readily adjusted to yield a water dispersible or water soluble compound having the desired degree of balance between hydrophilic and hydrophobic properties.

Useful nonionic surfactants include block polyoxypropylene-polyoxyethylene polymeric compounds based upon propylene glycol, ethylene glycol, glycerol, trimethylolpropane, and ethylenediamine as the initiator reactive hydrogen compound. Examples of polymeric compounds made from a sequential propoxylation and ethoxylation of initiator are commercially available under the trade name PLURONIC® manufactured by BASF Corp. PLURONIC® compounds are difunctional (two reactive hydrogens) compounds formed by condensing ethylene oxide with a hydrophobic base formed by the addition of propylene oxide to two hydroxyl groups of propylene glycol. This hydrophobic portion of the molecule weighs from about 1,000 to about 4,000. Ethylene oxide is then added to sandwich this hydrophobe between hydrophilic groups, controlled by length to constitute from about 10% by weight to about 80% by weight of the final molecule. TETRONIC® compounds are tetra-functional block copolymers derived from the sequential additional of propylene oxide and ethylene oxide to ethylenediamine. The molecular weight of the propylene oxide hydrotype ranges from about 500 to about 7,000; and, the hydrophile, ethylene oxide, is added to constitute from about 10% by weight to about 80% by weight of the molecule.

Also useful nonionic surfactants include the condensation products of one mole of alkyl phenol wherein the alkyl constituent, contains from about 8 to about 18 carbon atoms with from about 3 to about 50 moles of ethylene oxide. The alkyl group can, for example, be represented by diisobutylene, di-amyl, polymerized propylene, isoctyl, nonyl, and di-nonyl. Examples of commercial compounds of this chemistry are available on the market under the trade name IGEPAL® manufactured by Rhone-Poulenc and TRITON® manufactured by Union Carbide.

Likewise useful nonionic surfactants include condensation products of one mole of a saturated or unsaturated, straight or branched chain alcohol having from about 6 to about 24 carbon atoms with from about 3 to about 50 moles of ethylene oxide. The alcohol moiety can consist of mixtures of alcohols in the above delineated carbon range or it can consist of an alcohol having a specific number of carbon atoms within this range. Examples of like commercial surfactants are available under the trade name NEODOL® manufactured by Shell Chemical Co. and ALFONIC® manufactured by Vista Chemical Co. A preferred class of nonionic surfactants are nonyl phenol ethoxylates, or NPE.

Condensation products of one mole of saturated or unsaturated, straight or branched chain carboxylic acid having from about 8 to about 18 carbon atoms with from about 6 to about 50 moles of ethylene oxide. The acid moiety can consist of mixtures of acids in the above delineated carbon atoms range or it can consist of an acid having a specific number of carbon atoms within the range. Examples of commercial compounds of this chemistry are available on the market under the trade name NOPALCOL® manufactured by Henkel Corporation and LIPOPEG® manufactured by Lipo Chemicals, Inc. In addition to ethoxylated carboxylic acids, commonly called polyethylene glycol esters, other alkanoic acid esters formed by reaction with glycerides, glycerin, and polyhydric (saccharide or sorbitan/sorbitol) alcohols have application in this invention. All of these ester moieties have one or more reactive hydrogen sites on their molecule which can undergo further acylation or ethylene oxide (alkoxide) addition to control the hydrophilicity of these substances.

Semi-polar nonionic surfactants include water soluble amine oxides containing one alkyl moiety of from about 10 to 18 carbon atoms and two moieties selected from the group of alkyl and hydroxyalkyl moieties of from about 1 to about 3 carbon atoms; water soluble phosphine oxides containing one alkyl moiety of about 10 to 18 carbon atoms and two moieties selected from the group consisting of alkyl groups and hydroxyalkyl groups containing from about 1 to 3 carbon atoms; and water soluble sulfoxides containing one alkyl moiety of from about 10 to 18 carbon atoms and a moiety selected from the group consisting of alkyl and hydroxylalkyl moieties of from about 1 to 3 carbon atoms. Nonionic surfactants are of the formula $R^1 (OC_2H_4)_n$ OH, wherein $R^1$ is a $C_6$-$C_{16}$ alkyl group and n is from 3 to about 80 can be used. Condensation products of $C_6$-$C_{15}$ alcohols with from about 5 to about 20 moles of ethylene oxide per mole of alcohol, e.g., $C_{12}$-$C_{14}$ alcohol condensed with about 6.5 moles of ethylene oxide per mole of alcohol.

Amphoteric surfactants include derivatives of aliphatic or aliphatic derivatives of heterocyclic secondary and tertiary amines in which the aliphatic moiety can be straight chain or branched and wherein one of the aliphatic substituents contain from about 8 to 18 carbon atoms and at least one aliphatic substituent contains an anionic water solubilizing group.

Cationic surfactants can also be included in the present detergent granules. Cationic surfactants include a wide variety of compounds characterized by one or more organic hydrophobic groups and a quaternary nitrogen carrying the positive charge. Pentavalent nitrogen ring compounds are also considered quaternary nitrogen compounds. Halides, methyl sulfate and hydroxide are suitable. Tertiary amines can have characteristics similar to cationic surfactants at washing solution pH values less than about 8.5. A more complete disclosure of these and other cationic surfactants useful herein can be found in U.S. Pat. No. 4,228,044, Cambre, issued Oct. 14, 1980, incorporated herein by reference.

Useful cationic surfactants also include those described in U.S. Pat. No. 4,222,905, Cockrell, issued Sep. 16, 1980, and in U.S. Pat. No. 4,239,659, Murphy, issued Dec. 16, 1980, both incorporated herein by reference.

Alkalinity Source

A source of alkalinity is needed to control the pH of the use detergent solution. The alkalinity source is selected from the group consisting of alkali metal hydroxide, such a sodium hydroxide, potassium hydroxide or mixtures thereof; an alkali metal silicate such as sodium metasilicate may also be used. The preferred source, which is the most cost-effective, is commercially available sodium hydroxide which can be obtained in aqueous solutions in a concentration of about 50 wt-% and in a variety of solid forms in varying particle sizes. The sodium hydroxide can be employed in the invention in either liquid or solid form or a mixture of both. Other sources of alkalinity are useful but not limited to the following: alkali metal carbonates, alkali metal bicarbonates, alkali metal sesquicarbonates, alkali metal borates and alkali metal silicate. The carbonate and borate forms are typically used in place of the alkali metal hydroxide when a lower pH is desired.

Other Ingredients

Other ingredients suitable for inclusion in a granular linen detergent, such as a bleach or other additives can be added to the present compositions. These include detergency builders, suds boosters or suds suppressers, anti-tarnish and anticorrosion agents, soil suspending agents, soil release agents, germicides, pH adjusting agents, non-builder alkalinity sources, chelating agents, smectite clays, enzymes, enzyme-stabilizing agents and perfumes. Such ingredients are described in U.S. Pat. No. 3,936,537, incorporated herein by reference.

Builders (or sequestrants) are employed to sequester hardness ions and to help adjust the pH of the laundering liquor. Such builders can be employed in concentrations up to about 85% by weight, preferably from about 0.5% to about 50% by weight, most preferably from about 10% to about 30% by weight, of the compositions herein to provide their builder and pH-controlling functions. The builders herein include any of the conventional inorganic and organic water soluble builder salts. Such builders can be, for example, water soluble salts of phosphates including tripolyphosphates, pyrophosphates, orthophosphates, higher polyphosphates, other carbonates, silicates, and organic polycarboxylates. Specific preferred examples of inorganic phosphate builders include sodium and potassium tripolyphosphates and pyrophosphates. Nonphosphorus-containing materials can also be selected for use herein as builders.

Specific examples of non-phosphorus, inorganic detergent builder ingredients include water soluble bicarbonate, and silicate salts using alkali metals, e.g., sodium and potassium. Water soluble, organic builders are also useful herein. For example, the alkali-metal polycarboxylates are useful in the present compositions. Specific examples of the polycarboxylate builder salts include sodium and potassium salts of ethylenediaminetetraacetic acid, nitrilotriacetic acid, oxydisuccinic acid, mellitic acid, benzene polycarboxylic acid, polyacrylic acid, and polymaleic acid. Other desirable polycarboxylate builders are the builders set forth in U.S. Pat. No. 3,308,067, incorporated herein by reference. Examples of such materials include the water soluble salts of homo- and copolymers of aliphatic carboxylic acids such as maleic acid, itaconic acid, mesaconic acid, fumaric acid, aconitic acid, citraconic acid, and methylenemalonic acid.

Other suitable polymeric polycarboxylates are the polyacetal carboxylates described in U.S. Pat. Nos. 4,144,226 and 4,246,495, both incorporated herein by reference. These polyacetal carboxylates can be prepared by bringing together under polymerization conditions an ester of glyoxylic acid and a polymerization initiator. The resulting polyacetal carboxylate ester is then attached to chemically stable end groups to stabilize the polyacetal carboxylate against rapid depolymerization alkaline solution, converted to the corresponding salt, and added to a surfactant.

Bleaching agents and activators useful herein are also described in U.S. Pat. Nos. 4,412,934, 4,483,781, 4,634,551, and 4,909,953, all of which are incorporated herein by reference. Chelating agents are also described in U.S. Pat. No. 4,663,071, incorporated herein by reference. Suds modifiers are also optional ingredients and are described in U.S. Pat. Nos. 3,933,672, and 4,136,045, both incorporated herein by reference.

The compositions for the alkaline wash step may contain one or more additional detergent components selected from additional surfactants, additional bleaches, bleach catalysts, alkalinity systems, builders, organic polymeric compounds, additional enzymes, suds suppressers, lime soap dispersants, soil suspension and anti-redeposition agents and corrosion inhibitors.

Compositions of the Invention

Examples of useful ranges of components for the linen treatment composition of the invention include those provided in the following table, with water making up any remainder:

| Component | Weight percent | Preferred Weight percent | More Preferred Weight percent |
|---|---|---|---|
| Acid source | 6-24 | 9-21 | 12-18 |
| Hydroxycarboxylic acid | 15-55 | 20-50 | 25-45 |
| Carboxylate polymer | 0-10 | 0-8 | 0-6 |
| Chelant | 0-8 | 0-6 | 0-4 |

The invention has been shown and described herein in what is considered to be the most practical and preferred embodiment. The applicant recognizes, however, that departures may be made therefrom within the scope of the invention and that obvious modifications will occur to a person skilled in the art. The examples which follow are intended for purposes of illustration only and are not intended to limit the scope of the invention. All references cited herein are hereby incorporated in their entirety by reference.

EXAMPLES

Example 1

Iron Control Test Method

White fabric swatches of cotton (CO) and polyester cotton blend (P/C) were soaked for 20 seconds in a solution of 300 PPM of $Fe^{3+}$ at a temperature of 122° F. Next the test linen treatment product of interest was added and the solution and product were mixed for 10 minutes. The swatches were then rinsed with de-ionized water and the whiteness/yellowness difference was measured as compared to a reference swatch without treatment. The results with no treatment at varying pH values are shown in FIG. 1. With decreasing pH, iron oxide causes stronger yellow discoloration on the linen. YI, L* and b* values were taken with a spectroscope.

FIG. 1 is a graph showing the effect of pH on yellowness of fabric in iron supplemented water with no treatment. The yellowness index YI is a measurement of yellowness taken with a spectroscope, and a positive b* value is another measurement unit for white to yellow. [Negative b* values represent blue discoloration.] A higher b* or YI value indicates more yellowing. As can be seen, as a general trend, as pH decreases, yellowness on the fabric increases. This represents a significant challenge for any treatment as reducing any residual alkali to a lower pH also will cause increased yellowing.

Figure 2:
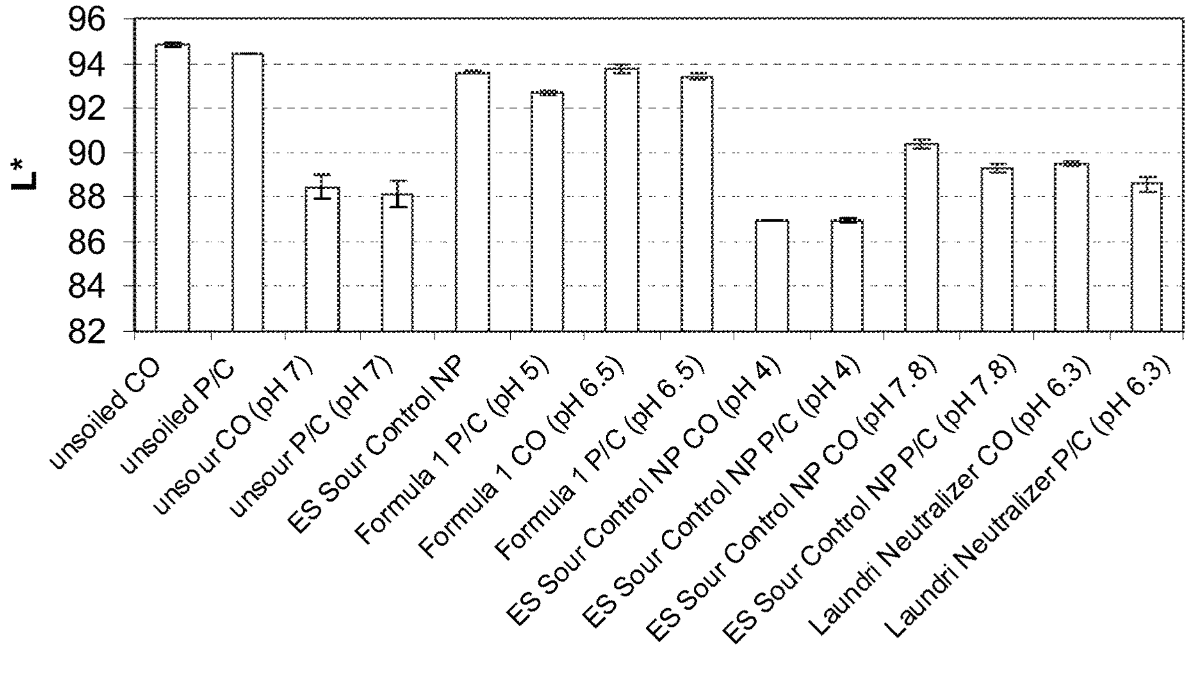
FIG. 2 is a measurement of the effect of pH and whiteness of fabric in iron supplemented water comparing typical sour treatment formulations (Eco-Star Sour Control NP or Sour VII and Laundri Neutralizer) and Formula 1, a formulation of the invention. Measurements were taken with a spectroscope. L* is a measure of whiteness of the fabric. As can be seen, the formula of the invention gave the best whiteness results and created a pH of about 5.5 to about 7 of the resultant water and fabric.

FIG. 2 shows measurements of pH and whiteness of fabric soaked in iron supplemented water that also contains typical sour treatment formulations (Eco-Star Sour Control NP and Laundri Neutralizer) or Formula 1, a formulation of the invention. Whiteness L* was measured with a spectroscope. As can be seen the formula of the invention gave the best results of whiteness and created a pH of about 5.5 to about 7 of the resultant rinse water.

Figure 3:
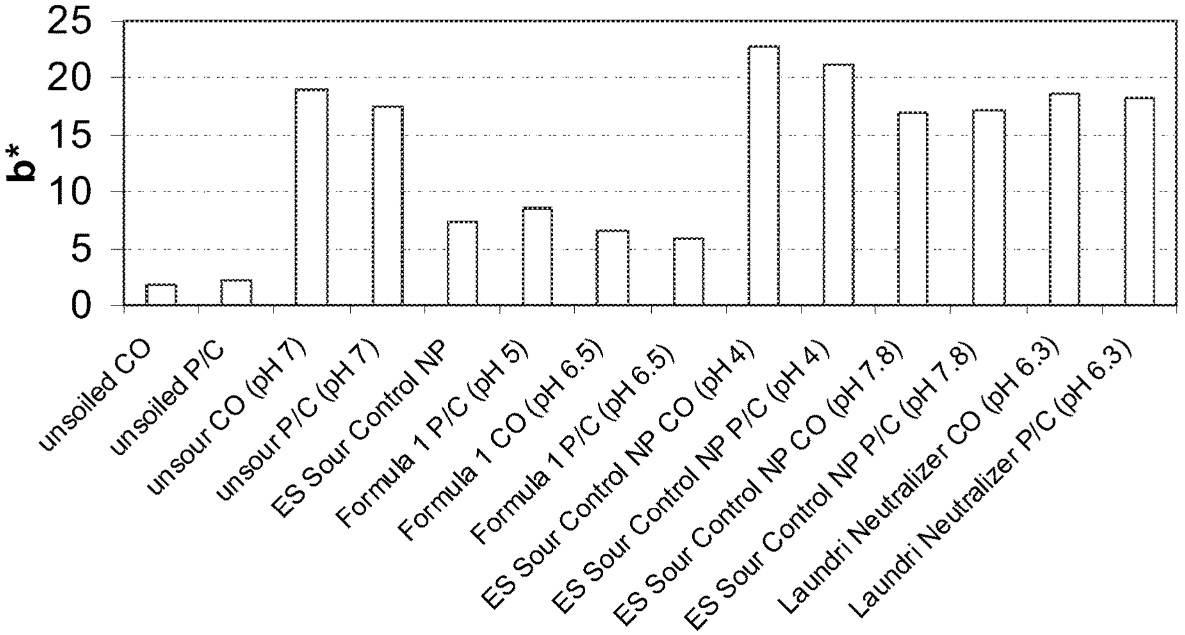
FIG. 3 is a graph shown the effect of pH and yellowing of fabric in iron supplemented water comparing typical sour treatment formulations (Eco-Star Sour Control NP and Laundri Neutralizer), and Formula 1, a formulation of the invention. As can be seen, the formula of the invention gave the best results, with the least amount of yellowing and a pH of about 5 to about 6.5 of the resultant water and fabric.

FIG. 3 is a graph showing the pH and yellowness of fabric soaked in iron supplemented water that also contains typical sour treatment formulations (Eco-Star Sour Control NP and Laundri Neutralizer) or Formula 1, a formulation of the invention. Yellowness YI is measured with a spectroscope. As can be seen, the formula of the invention gave the best results with the least amount of yellowing, and it created a pH of about 5 to about 6.5 of the resultant water.

Figure 4:
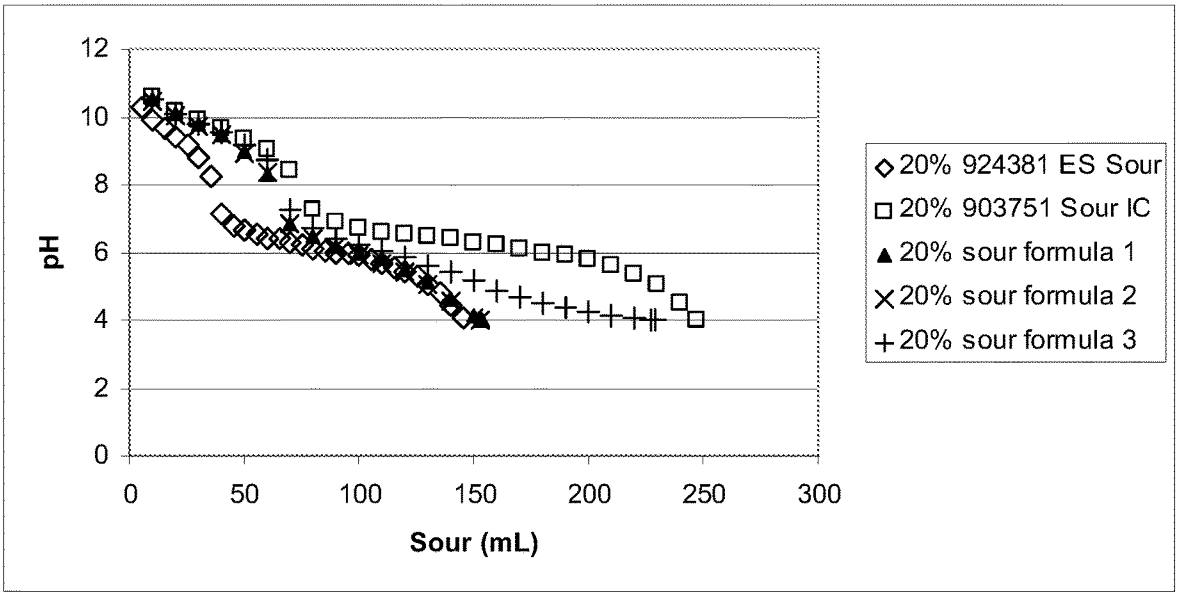
FIG. 4 is a titration curve showing various linen treatment formulations and their pH at various dosages.

FIG. 4 is a titration curve showing various linen treatment formulations and their pH at various dosages.

Formula 1 and other formulations according to the invention were prepared and tested with similar results:

Formula 1. water 28%, sulfuric acid (98%) 15.5%, urea 9.495%, citric acid anhydrous 5%, polyacrylic acid sodium salt (50%) 12%, gluconic acid 30%

Formula 2. water 26%, sulfuric acid (98%) 15.505%, urea 9.495%, citric acid anhydrous 5%, polyacrylic acid sodium salt (50%) 12%, gluconic acid 30%, chelant 2%

Formula 3. water 30.5%, formic acid 13%, polyacrylic acid sodium salt (50%) 12%, chelant 1.5%, gluconic acid 35%, citric acid anhydrous 8%

What is claimed is:

1. A method for treating linen, to reduce or eliminate iron deposition/redeposition comprising:

washing the linen with a detergent at an alkaline pH in a washing machine;

rinsing said linen;

obtaining a liquid linen treatment composition consisting of: about 15 wt. % to about 45 wt. % of a hydroxycarboxylic acid which is selected from one or more of: glycolic acid, malic acid, lactic acid, tartaric acid, citric acid, hydroxybutyric acid, glyceric acid, tartronic acid, salicylic acid, m-hydroxybenzoic acid, p-hydroxybenzoic acid, gallic acid, mandelic acid and gluconic acid; about 1 wt. 1% about 10 wt. % of a carboxylate polymer which is a polyacrylic acid salt, a polymaleic acid salt, or a combination thereof; water in the amount of between about 15 wt. % and about 45 wt. %; about 12 wt. % to about 21 wt. % of sulfuric acid form urea sulfate; and optionally one or more additives selected from a chelating agent, a dye, a perfume, an additional acid source, a surfactant and/or a defoamer;

applying the linen treatment composition or a use solution of said linen treatment composition to said linen; wherein the use solution of the linen treatment composition has a pH of between about 3 and about 10; and reducing or eliminating iron deposition or redeposition on said linen, wherein the linen treatment composition is free of a peroxycarboxylic acid and is applied prior to washing said linen, after washing said linen, during washing of said linen, or multiple times throughout the method.

2. The method of claim 1, wherein said hydroxycarboxylic acid is selected from one or more of: glycolic acid, malic acid, lactic acid, tartaric acid, citric acid, glyceric acid, tartronic acid, salicylic acid, and gluconic acid.

3. The method of claim 1, wherein said sulfuric acid is present in an amount between about 12 wt. % and about 18 wt. %.

4. The method of claim 1, wherein said sulfuric acid and urea are in a molar ratio of about 1:1.

5. The method of claim 1, wherein said additional acid source is selected from one or more of formic acid, acetic acid, propionic acid, butyric acid, valeric acid, caproic acid, itaconic acid, trichloroacetic acid, urea hydrochloride, benzoic acid, oxalic acid, malonic acid, succinic acid, glutaric acid, maleic acid, fumaric acid, adipic acid, terephthalic acid, sulfamic acid, methylsulfamic acid, hydrochloric acid, hydrobromic acid, hydrofluoric acid, and nitric acid.

6. The method of claim 1, wherein the use solution of the linen treatment composition has a pH of between about 3 and about 6.

7. The method of claim 1, wherein the use solution of the linen treatment composition has a pH of between about 7 and about 10.

8. The method of claim 1, wherein said carboxylate polymer is the polyacrylic acid salt.

9. The method of claim 2, wherein said hydroxycarboxylic acid is citric acid.

10. The method of claim 1, wherein said chelating agent is present in an amount up to about 8 wt. %.

11. The method of claim 10, wherein the chelating agent is selected from diethylene triamine pentaacetate, diethylene triamine penta(methyl phosphonic acid), ethylene diamine-N'N'-disuccinic acid, ethylene diamine tetraacetate, ethylene diamine tetra(methylene phosphonic acid), hydroxyethane di(methylene phosphonic acid), glutamic acid, methylglycinediacetic acid, L-aspartic acid N,N-diacetic acid tetrasodium salt, sodium diethanolglycine/2-hydroxyethyliminodiacetic acid disodium salt, iminodisuccinic acid and salts, ethylenediaminedisuccinic acid and salts, or combinations thereof.

12. The method of claim 1, wherein said use solution is formed by diluting the linen treatment composition with a dilution ratio between about 1:10 and about 1:10,000.

13. The method of claim 1, wherein the carboxylate polymer is in a concentration of between about 5 wt. % to about 10 wt. %.

* * * * *